US008468119B2

(12) United States Patent
Kumar et al.

(10) Patent No.: US 8,468,119 B2
(45) Date of Patent: Jun. 18, 2013

(54) MATCHING DATA FROM DISPARATE SOURCES

(75) Inventors: Udaya Kumar, New Street (IE); Louay Gargoum, DB Killiney (IE); Tony O'Donnell, Kildare Town (IE)

(73) Assignee: Business Objects Software Ltd., Dublin (IE)

( * ) Notice: Subject to any disclaimer, the term of this patent is extended or adjusted under 35 U.S.C. 154(b) by 196 days.

(21) Appl. No.: 12/836,234

(22) Filed: Jul. 14, 2010

(65) Prior Publication Data

US 2012/0016899 A1 Jan. 19, 2012

(51) Int. Cl.
*G06F 7/00* (2006.01)
*G06F 17/00* (2006.01)

(52) U.S. Cl.
USPC .......................................... 707/602

(58) Field of Classification Search
USPC .................. 707/769, 600, 602, 603
See application file for complete search history.

(56) References Cited

U.S. PATENT DOCUMENTS

| | | | |
|---|---|---|---|
| 7,039,656 B1 * | 5/2006 | Tsai et al. ............... | 1/1 |
| 7,433,891 B2 * | 10/2008 | Haber et al. ........... | 1/1 |
| 7,784,038 B2 * | 8/2010 | Charlebois et al. ...... | 717/144 |
| 2002/0026443 A1 * | 2/2002 | Chang et al. .......... | 707/10 |
| 2002/0062312 A1 * | 5/2002 | Gupta et al. .......... | 707/3 |
| 2003/0126102 A1 * | 7/2003 | Borthwick ........... | 706/21 |
| 2003/0154194 A1 * | 8/2003 | Jonas .................. | 707/3 |
| 2003/0212654 A1 * | 11/2003 | Harper et al. ........ | 707/1 |
| 2003/0225742 A1 * | 12/2003 | Tenner et al. ........ | 707/2 |
| 2004/0073564 A1 * | 4/2004 | Haber et al. .......... | 707/101 |
| 2004/0083199 A1 * | 4/2004 | Govindugari et al. .... | 707/1 |
| 2004/0172394 A1 * | 9/2004 | Smolsky .............. | 707/6 |
| 2005/0240592 A1 * | 10/2005 | Mamou et al. ........ | 707/9 |
| 2005/0251513 A1 * | 11/2005 | Tenazas ............... | 707/3 |
| 2006/0010119 A1 * | 1/2006 | Jonas .................. | 707/3 |
| 2006/0218136 A1 * | 9/2006 | Surakka et al. ....... | 707/5 |
| 2006/0230033 A1 * | 10/2006 | Halevy et al. ........ | 707/3 |
| 2006/0230039 A1 * | 10/2006 | Shull et al. .......... | 707/6 |
| 2006/0253423 A1 * | 11/2006 | McLane et al. ....... | 707/2 |
| 2006/0253476 A1 * | 11/2006 | Roth et al. ........... | 707/100 |
| 2007/0038674 A1 * | 2/2007 | Bejar ................. | 707/104.1 |
| 2008/0077573 A1 * | 3/2008 | Weinberg et al. ..... | 707/5 |
| 2008/0319983 A1 * | 12/2008 | Meadows ............. | 707/5 |
| 2009/0018996 A1 * | 1/2009 | Hunt et al. .......... | 707/2 |
| 2009/0089254 A1 * | 4/2009 | Von Kaenel et al. .... | 707/3 |
| 2009/0106245 A1 * | 4/2009 | Salcedo .............. | 707/6 |
| 2009/0144070 A1 * | 6/2009 | Psota et al. .......... | 705/1 |
| 2009/0182755 A1 * | 7/2009 | Adair et al. .......... | 707/101 |
| 2009/0192982 A1 * | 7/2009 | Samuelson et al. .... | 707/3 |
| 2009/0222470 A1 * | 9/2009 | Kemp et al. ......... | 707/102 |
| 2010/0185637 A1 * | 7/2010 | Morris et al. ........ | 707/758 |
| 2011/0320433 A1 * | 12/2011 | Mohiuddin et al. .... | 707/714 |

* cited by examiner

*Primary Examiner* — Robert Beausoliel, Jr.
*Assistant Examiner* — Nicholas Allen
(74) *Attorney, Agent, or Firm* — Schwegman Lundberg & Woessner, P.A.

(57) ABSTRACT

Apparatus, systems, and methods may operate to receive a first identification of two or more records that match and to search at least two sources of data to locate a set of potential matching records, based on element transformation to determine common characteristics of the two or more records. Further activities may include publishing the set of potential matching records, receiving a second identification of matching members of the set, and searching at least one repository to locate further matching records based on the second identification and the common characteristics. Additional apparatus, systems, and methods are disclosed.

21 Claims, 12 Drawing Sheets

| DATA A | | DATA B | |
|---|---|---|---|
| ID | PRODUCT | ID | PRODUCT |
| 100 | IPOD | 100 | ipod |
| 101 | XBOX | 101 | xbox |
| 102 | WII | 102 | wii |
| 103 | PS3 | 103 | ps3 |
| 104 | PS2 | 104 | ps2 |
| 105 | NINTENDO DS | 105 | nintendo ds |
| 106 | GAME BOY | 106 | game boy |
| 107 | NINTENDO DS | | |
| 110 | PS III | 1110 | PS III |
| 112 | Game Cube X | 112 | game cube |
| 121 | TOOTHPASTE HERBAL | 121 | Toothpaste |
| 122 | ARTON 100ml | 122 | Arton 100ml |
| 1123 | shipper | 123 | SHIPPER |
| 150 | SNUG | 150 | GUNS |
| 151 | SENSOR | 151 | ROSES |

FIG. 5

MATCHING DATA FROM DISPARATE SOURCES

LIMITED COPYRIGHT WAIVER

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2010 Business Objects Software Ltd. of Ireland, All Rights Reserved.

BACKGROUND

The goal of operational Business Intelligence (BI) is to help organizations improve the efficiency of their business by providing information that can be used to make better decisions, aligning day-to-day operations with strategic goals. The creation and querying of customized virtual database schemas over a set of distributed and heterogeneous data sources may be implemented as part of this process. Thus, in many business entities, data is stored in multiple systems, each having different formats and access conventions. Unfortunately, the non-uniform distribution of data across disparate sources may also serve to frustrate business users seeking a more unified view of the data throughout their organization.

BRIEF DESCRIPTION OF THE DRAWINGS

Some embodiments are illustrated by way of example and not limitation in the figures of the accompanying drawings, in which:

FIG. 5 is a table of data from disparate sources, to be matched according to various embodiments of the invention;

DETAILED DESCRIPTION

Figure 1:
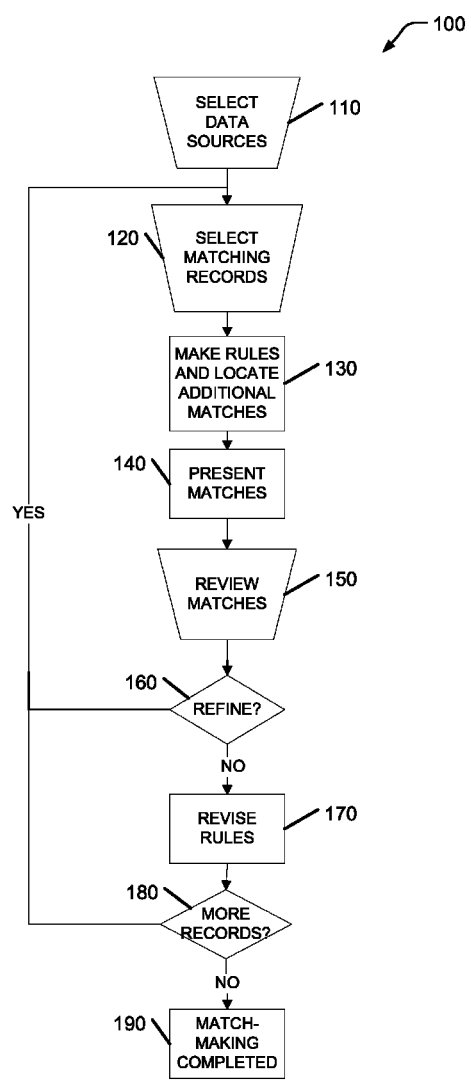
FIG. 1 illustrates a matching process, according to various embodiments of the invention.

To address the challenges presented by non-uniform data storage protocols distributed among disparate sources, various embodiments operate to take advantage of current business models, where Business Users understand the relationship between data components and make decisions by finding similarities in the data and thereafter, describing their decisions. This decision-making model can be leveraged using automated matching processes to provide a tool that can be used for collaboration among stakeholders.

Thus, the embodiments described herein can provide several benefits. For example, data processing execution time may be decreased by empowering Business Users to make decisions and take actions. Near-instant visual feedback can be provided with respect to how Business Users decide to implement the unification of data across the enterprise. Finally, if the interface provided by various embodiments is intuitive, Business Users can remain focused on the application, rather than getting caught up in the details of achieving a solution.

Match-making, as described herein, presents a mechanism for bringing together records from disparate sources. It offers a rich set of options that allow Business Users to iteratively describe the relationships between the records in these sources. These relationships are used to determine match-making criteria. These criteria are then applied to identify other matching records. Thus, match-making quality is enhanced by near-instantaneous visual feedback. In many embodiments, a framework is presented that enables matching data by applying the principles of data fusion and evolution by mutation. In this way, data from disparate sources can be matched, and merging principles applied to produce a useful output.

Consider a scenario that illustrates the match-making process, with two disparate data sources, each providing input to the process with similar data, but in a different structure or format (e.g., perhaps stored according to different storage or access protocols). A Business User may act to provide examples of matching data by choosing matching records from each of the disparate sources. A computer can then be used to determine different ways in which the selected records match. The elements which are found to match can be used to produce a set of rules that in turn are applied to records within the data sources to produce additional matching records.

Match-making can be described in some embodiments by considering three activities: analyzing facts, matching records, and refinement.

To analyze facts, an initial set of matching records is identified. This may be accomplished manually, or via machine. For example, a Business User may select one or more records from each data source which they believe represent the same information. The system then executes a series of tests to analyze and identify how tuples of facts in each of two records are related. This part of the process results in the production of matching rules.

The matching rules are applied to identify additional records that potentially match according to the rules. This activity can be accomplished, and supplemented by a visual feedback display, where the potential matching records are presented to the Business User for evaluation.

To refine the results, the Business User can review the records identified as a result of applying the matching rules. Those records in the set of potentially matching records that do not in fact match records in the originally-identified set can be de-selected. This activity operates to extend the analysis of facts by introducing additional match-making criteria, which can in turn be used to refine the matching rules developed earlier.

Now consider a hypothetical use case for a large product manufacturer. Product master data from a production system in Australia is to be moved to a production system in Europe. The match-making process is introduced to find existing similarities between data in these two systems.

The Business User may begin by reviewing the data as it exists within the two sources. A record is selected from each source and the selected pair of records is designated as the original set of matching records. The match-making system then applies some identification techniques to determine matching characteristics, data manipulation techniques to develop matching rules, and searching techniques to located additional matching records. Different techniques may be applied to the same data, or other data to locate additional matches among the records.

Once potential matching records are located, these may be presented to the Business User, who operates to refine the matching of additional records by eliminating records in the result that do not match. This process of analysis, identification, and refinement may be repeated as often as desired.

FIG. 1 illustrates a matching process 100, according to various embodiments of the invention. The process 100 may begin with the selection of disparate data sources to be matched and/or fused at block 110. This may occur using a machine, or a Business User. For example, sources may be selected using a Structured Query Language statement, or selected from a menu presented on a display. The process 100 may continue on to block 120 with the original selection of matching records, such as the selection of matching rows from each of the selected data sources. Again, this may occur via the activity of a machine, or a Business User.

For example, the activities at blocks 110, 120 may comprise launching a match-maker application, importing data from sources A and B (e.g., data from an SAP® database and a Microsoft® Excel® spreadsheet). Records Ri and Rj from sources SA and SB, respectively, may be selected to identify a set of original matching records. Once the original set of matching data has been established, one or more iterations of a part of the process 100 (e.g., blocks 120-180) may occur.

Thus, the process 100 may go on to block 130 to include processing and analysis by the match-maker application to make up a set of matching rules. Additional, potential matching records are located, and presented to the Business User at block 140.

The potential matching records are reviewed at block 150, to determine whether they indeed match. If refinement is needed (e.g., some of the potentially-matching records do not in fact match), then the process may include further selection of matching records at block 120. If no refinement is needed, as determined at block 150, then the process may continue on to block 170 with implementing (e.g., making permanent) the revisions to the matching rules that may have been made as part of the activity at block 130. At this point, the confidence in matching may also be determined and recorded.

The process 100 may terminate at block 190, if all records have been processed, as determined at block 180. Otherwise, the process 100 may return to block 120, with the selection of additional, potential matching records, according to the revised matching rules of block 170.

Figure 2:
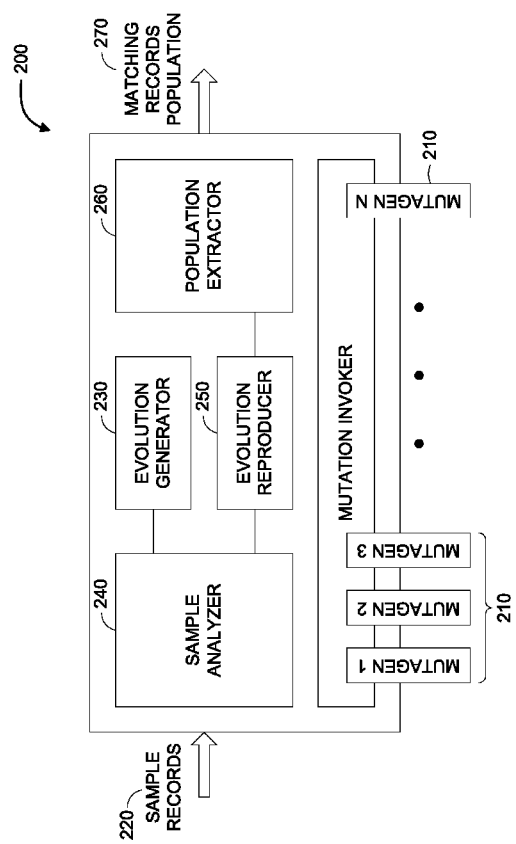
FIG. 2 illustrates a matching architecture, according to various embodiments of the invention.

FIG. 2 illustrates a matching architecture 200, according to various embodiments of the invention. The architecture 200 provides a framework to create mutagens 210 and to supply tools for match-making. Mutagens 210 can be pre-defined or user-defined, perhaps based on a formal signature. A mutagen 210 takes a record 220, or portion of a record to produce a transformed output. That is, a mutagen 210 applies a transformative manipulation (e.g., via generator 230) to the content of one record 220 in a pair of records to produce a variant, mutated form of the record. The mutated record can be compared to the pristine record in the pair (to which no mutagen 210 has been applied) to determine whether the mutated form of the record is now closer (using some measure of distance) to the pristine record in the pair. Match-making rules can be generated by aggregating a collection of those mutagens that operate to move records closer toward a strong match (e.g., a strong match may be achieved when the measure of distance between the records is less than some selected threshold distance).

Mutagens 210 may be implemented as pluggable tools. Examples of the transformations that can be effected by mutagens include: swapping character case, removing words, removing numbers, and capitalizing characters. Mutagens 210 may be implemented within a matching process as follows.

First, a set of samples (e.g., pairs of records or other items) are analyzed (e.g., via the sample analyzer 240), and possible ways of matching the samples are determined to produce a graph having a set of edges.

The edges are evaluated using mutagens to determine if evolution is possible. The Process of evolution produces a series of actions which are used to transform an input element to a desired output element. The elements to which mutagens are applied may be records, characters, cell content in a spreadsheet, etc. Each action is verified, to validate and (perhaps) optimize the actions that are used to evolve an input to a desired output. Verification and optimization may be accomplished using the Evolution Reproducer 250.

The edges which can be evolved are used to extract data from population. The extraction occurs (e.g., via the Population Extractor 260) by inducing evolution actions on desired edges to produce matching content 270. This process can be repeated across the entire population of input data, if desired.

Figure 3:
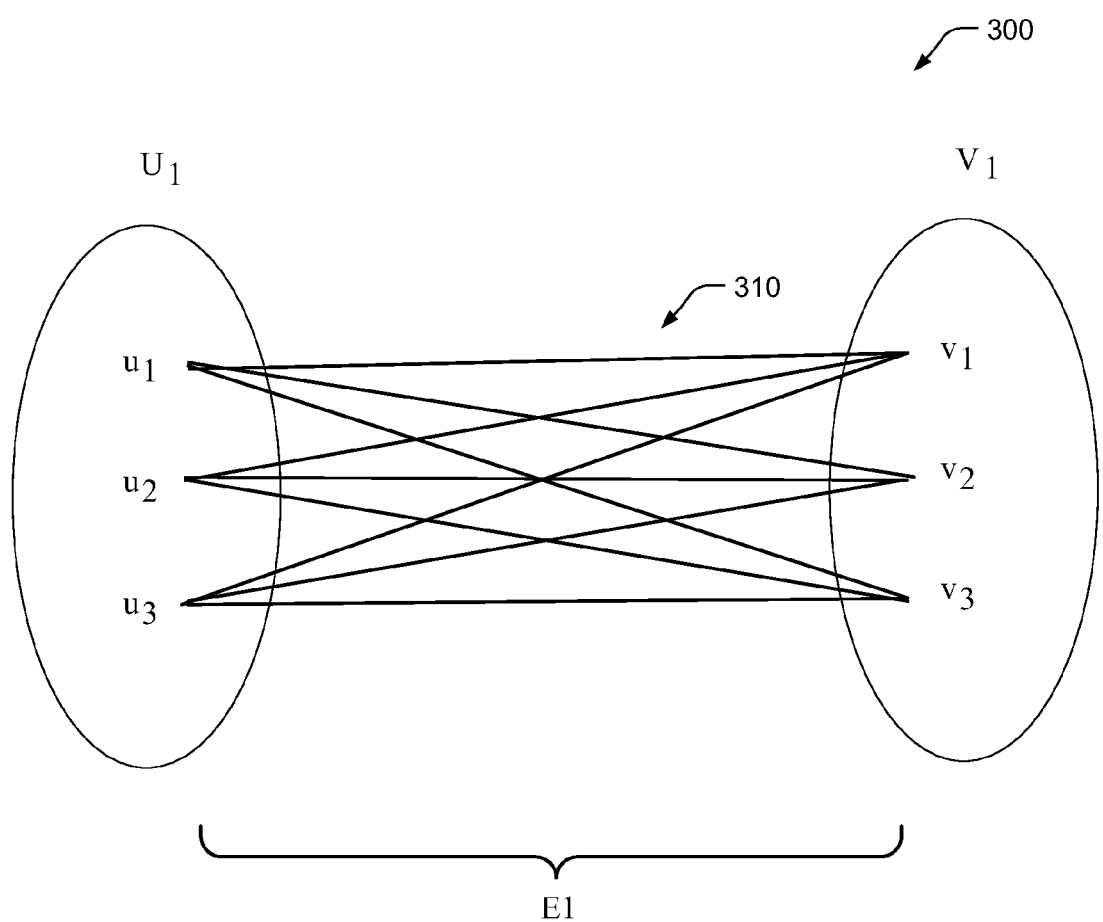
FIG. 3 illustrates a bi-partite matching graph, according to various embodiments of the invention.

FIG. 3 illustrates a bi-partite matching graph 300, according to various embodiments of the invention. To see how the graph 300 is used, consider a pair of records U1, V1 taken from disparate record sources, selected by a Business User as an original matching pair. Assume the pair of records is represented as two vertices (U1, V1) where the edges E1→(e1, e2, e3 . . . ) represent the relationship between the elements in the vertices. Tuples from U1 are represented by {u1, u2, u3, . . . } and tuples from V1 are represented by {v1, v2, v3, . . . }, which produces the bi-partite graph 300. Some embodiments use the graph 300 as a part of building a list of all possible edges 310. In this case, the list may be represented as:

(u1, v1), (u1, v2), (u1, v3), (u2, v1), (u2, v2), . . . , (u3, v3)∈LIST OF EDGES

For each edge, it can be determined whether the elements in the edge can be matched by applying one or more of a set of evolution actions. For example, when a mutagen is applied to the edges, the strength of the match may be determined by the number of characters in the evolved element that match the number of characters in the element that remains in its original (non-evolved) form. Thus, it may be that the match strength for the first three edges is determined to be e1=100%, e2=100%, and e3=20% with respect to applying a particular mutagen, such as one that operates to delete all spaces in a record to which it is applied.

One may assume that mutation involves the actions of a set of mutagens, to be regarded as a function F. The edges may comprise combinations of columns from one table to the next, for a given row, for example.

Thus, for every matched edge, various embodiments may operate to find new matching records using the function F. For example, if edges e1 and e2 are represented as:
e1→{(1, 2), (2, 3), (8, 8)}
e2→{(1, 2), (2, 3), (8, 9), (10, 11)}
Then by applying the function F to the records remaining in the sets of records taken from disparate sources, the identification of tuples that match a given record can be recorded for each edge.

In this way, the common records from all edges can be determined, which is the set of records matched by taking into account the original user-selected set of matching records represented by (U1, V1), which is e1∩e2→{(1, 2), (2, 3)}. Once the matching records for (U1, V1) are determined, the process can be repeated with a new set of matching records (U2, V2).

Figure 4:
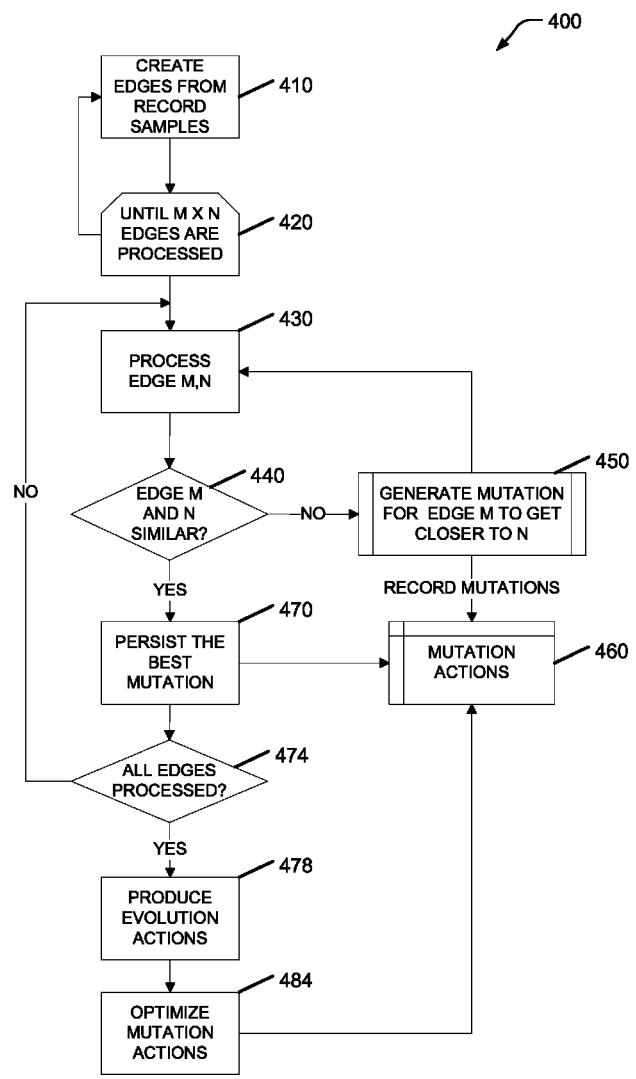
FIG. 4 illustrates an edge evaluation process, conducted within the matching process of FIG. 1, according to various embodiments of the invention.

FIG. 4 illustrates an edge evaluation process 400, conducted within the matching process of FIG. 1, according to various embodiments of the invention. At blocks 410, 420 graph edges are created from paired samples of matching records, perhaps selected by a Business User. In some embodiments, the edges are created until all possible combinations of elements (e.g., M elements in the first record of the pair, and N elements in the second element of the pair) in each pair are processed.

At blocks 430, 440, 450, 460, 470, mutagens are applied to determine which mutagens provide the strongest matches among the elements of each edge. To determine whether edges are similar, a measure of the matching strength may be used, such that a greater percentage of matching elements corresponds to a greater matching strength and a corresponding increase in the degree of similarity. To determine whether edges are similar at block 440, a similarity threshold can be established, such that any degree of similarity that exceeds a preselected similarity threshold indicates that the edges are "similar".

Mutations resulting in greater degrees of similarity are persisted at block 470, perhaps by recording them in a tangible storage medium. Mutations that result in reduced degrees of similarity are discarded, or modified and re-tested at blocks 450 and 430. This process of applying mutagens, determining degrees of similarity, modification of mutagens, re-testing, and storage can be conducted over all of the possible edges in some embodiments, as determined at block 474.

Once a set of useful mutagens has been accumulated at block 460, these can be used together for application to records taken from disparate sources at block 478 to determine whether additional matching records exist. Optimization of the mutation activity among the mutagens, based on order of application for example, may be used to reduce processing or speed up the provision of results at block 484.

FIG. 5 is a table 500 of data from disparate sources, to be matched according to various embodiments of the invention. This table 500 will be used to show how matching records can be determined using some of the embodiments described herein.

To begin, a Business User may select matching data from disparate sources 502 and 504. In this case, record 510 (including elements {100, IPOD}) is selected as matching record 520 (including elements {100, ipod}).

In many embodiments, an apparatus or system can operate to create all possible edges for evaluation. In this case, the set of all possible edges includes:
Edge {0, 0}→[100, 100]
Edge {0, 1}→[100, ipod]
Edge {1, 0}→[IPOD, 100]
Edge {1, 1}→[IPOD, ipod]

The apparatus or system may then operate to evaluate the edges to determine those that are similar. As part of the process, it can be determined how the edges forming part of the items taken from source 504 can be evolved to move closer to the edges forming part of the items taken from source 502.

For Edge {0, 0}, the degree of similarity is 100%, sometimes denoted by a value of 1. No mutagens are applied.

For Edge {0, 1}, the degree of similarity is 0%, sometimes denoted by a value of −1. This is the case even after mutagens are applied.

For Edge {1, 0}, the degree of similarity is 0%, sometimes denoted by a value of −1. This is the case even after mutagens are applied.

For Edge {1, 1}, the degree of similarity is also found to be 100%, sometimes denoted by a value of 1, after the mutagen "SwapCase" is applied to mutate "ipod", which results in transforming this element into "IPOD". That is, the Swap-Case mutagen operates to change lowercase characters to uppercase, and uppercase characters to lower case.

Thus, each edge may be found to be similar (1.0) or not (−1.0). A value or degree of similarity ranging between 0.0 and 1.0 implies that some amount of similarity can be obtained by applying a set of mutagens.

For example, an algorithm used to determine the degree of similarity may operate to implement "simple similarity computation". In this case, a processor assumes threshold values to evaluate similarity between elements making up edges. Thus, the bytes in two strings, X and Y, may be compared until the ratio of matching bytes over the longest string is within a desired threshold range, such as between 0.75 and 1.0, or 75% and 100%.

This process may yield a similarity value of 1 if all bytes match, and −1 when the number of matching bytes is less than the preselected threshold value. Any value less than the lower threshold limit may be used to indicate that the elements in a given edge are dissimilar (e.g., with a similarity value of −1). The same order of characters is assumed.

Mutation actions can be induced while analyzing the remainder of the population. The mutagens that are used to induce successful evolution (e.g., evolution that brings edge elements closer together, with a higher degree of similarity, or matching strength) can be used in finding similarities throughout the data that is available from the disparate sources 502, 504. This can be accomplished by processing the data in every row of the source 502, supplying mutagens for application to all edges that can be evaluated, applying the mutagens to produce evolution, and verifying each case of evolution to determine the resulting degree of similarity. In some embodiments, pre-processing activity may include inducing mutation with respect to the population from source 502, and storing the result. Then, evaluation activity may comprise computing similarity between the result and the data taken from source 504.

As an example of mutation, over the entire set of data available from the sources 502, 504, one or more mutagens can be applied to Edge {0,0} to determine the resulting degree of similarity with respect to all possible edges, represented as follows, with those edges having a high degree of similarity (e.g., greater than 90%) marked in bold text:
Edge {0, 0}→{{0, 0}, {0, 1}, {0, 2}, {0, 3}, {0, 4}, {0, 5}, {0, 6}, {0, 7}, {0, 8}, {0, 13}, {1, 1}, {2, 2}, {3, 3}, {4, 4}, {5, 5}, {6, 6}, {7, 0}, {7, 1}, {7, 2}, {7, 3}, {7, 4}, {7, 5}, {7, 6}, {7, 7}, {7, 8}, {7, 13}, {8, 2}, {8, 9}, {8, 10}, {8, 11}, {9, 10}, {10, 2}, {10, 9}, {10, 10}, {10, 11}, {12, 13}, {13, 14}}.

Similarly, over the entire set of data available from the sources 502, 504, one or more mutagens can be applied to Edge {1,1} to determine the resulting degree of similarity with respect to all possible edges, represented as follows:
Edge {1, 1}→{{0, 0}, {1, 1}, {2, 2}, {3, 3}, {4, 4}, {5, 5}, {5, 7}, {6, 6}, {11, 12}}.

An apparatus or system may operate to determine the common record number pairs from the returned sets, as follows:
Edge {0, 0}∩Edge {1, 1}∩Edge {1, 2}.

This gives a set of records that can be considered to represent the best matching pairs:
{{0, 0}, {1, 1}, {2, 2}, {3, 3}, {4, 4}, {5, 5}, {6, 6}}.

Headers (when available) can be reviewed within the disparate data sources and used to boost the level of confidence in matching edges. For example, a variety of actions can be applied to the header record set: Header→{0, 0}, {1, 1} to boost the confidence of the set of comparable edges: Comparable Edges→{0, 0}, {1, 1}. In most cases, the intersection of Header and Comparable Edges returns the best set of matching columns: Header ∩ Comparable edges→{0, 0}, {1, 1}.

Use of headers (e.g., column names) is optional; the technique of mutation via the application of mutagens is powerful, and often sufficient to find similarities. Thus, the use of headers for boosting confidence is optional in most situations. When metadata is available, the headers can be verified and checked with the record data types (e.g., number, string, address, country, etc.). Thus, the header "country" in a table taken from one source should match the data types for matching records in a table taken from another source. Similarly, the heading 530 of "ID" in one table taken from source 502 might be checked to see if it matches a numeric data type of a corresponding matching element in column 540 of the table taken from source 504. Determining whether a literal matching of column headings (as shown in FIG. 5) exists between the sources 502, 504 is not necessary, but may also be used as a confidence boosting mechanism.

Figure 6:
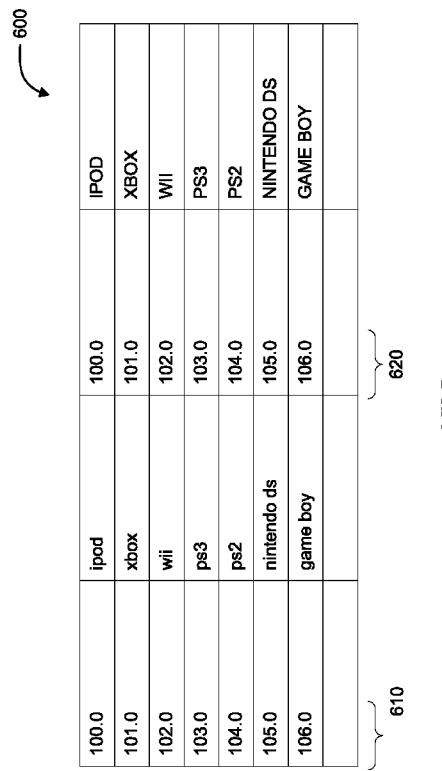
FIG. 6 illustrates a display of records from the table of FIG. 5, matched according to various embodiments of the invention.

FIG. 6 illustrates a display 600 of records from the table of FIG. 5, matched according to various embodiments of the invention. Here it can be seen that an apparatus or system can operate to retrieve all matching records, identified by the record number 610, 620, for display to a Business User.

Figure 7:
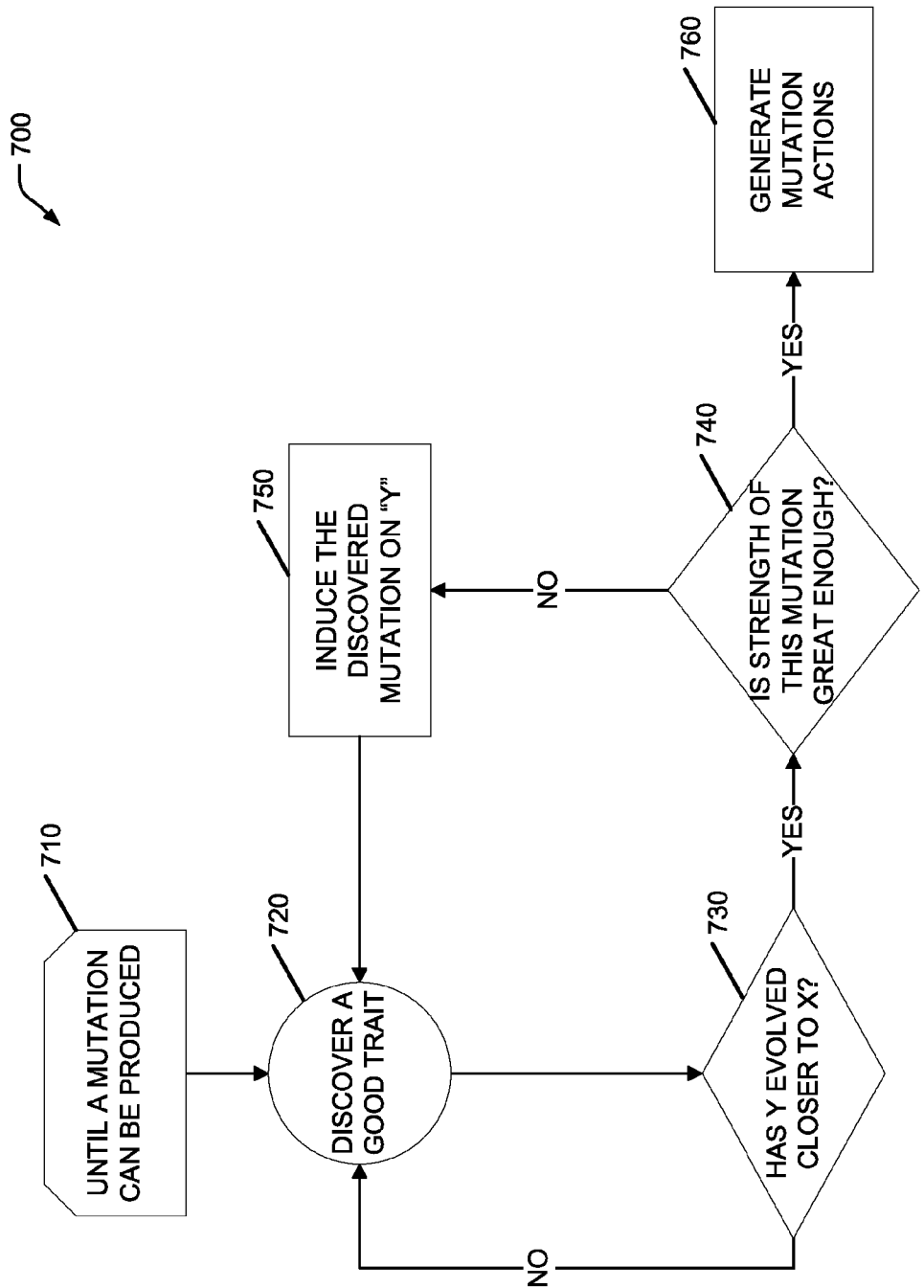
FIG. 7 illustrates the process of evolution by mutation, according to various embodiments of the invention.

FIG. 7 illustrates the process 700 of evolution by mutation, according to various embodiments of the invention. Here, the inputs to the process 700 may include strings X and Y, for example. The activities of blocks 710, 720, 730, 740 and 750 may be applied until a mutation occurs that is deemed "good enough" at block 740, which can mean that the mutated edge element provides some desired degree of similarity to another, non-evolved element of the edge. The main constraint on the process 700 is the strength of matching, and the output of the process 700 comprises the mutation actions which are found to provide the desired degree of similarity (e.g., a degree of similarity that is calculated to be some value above a selected threshold).

Thus, the process 700 may begin at block 710 and operate until a satisfactory mutation can be produced. This may include discovering and/or applying mutagens as part of the activity at block 720 (see description of FIG. 8, below).

Dependency is introduced via the invocation of mutation at block 750, and verification at blocks 730 and 740. Once one or more mutations are found that satisfy the criteria of block 740 (e.g., a degree of similarity that exceeds a given threshold), these can be provided as a set of actions that can be applied to additional data to determine whether additional, potential matching records exist within the data taken from disparate sources.

To determine which mutations work the best, an evolution generator can be used (see element 230 of FIG. 2). The match-making process can be described with the analogy of "evolution by mutation", evolving an element "a" to get closer to "b" by mutating "a". The series of mutations applied to "a" produces a set of mutation actions, which together provide the evolution of "a" to be closer to "b".

Figure 8:
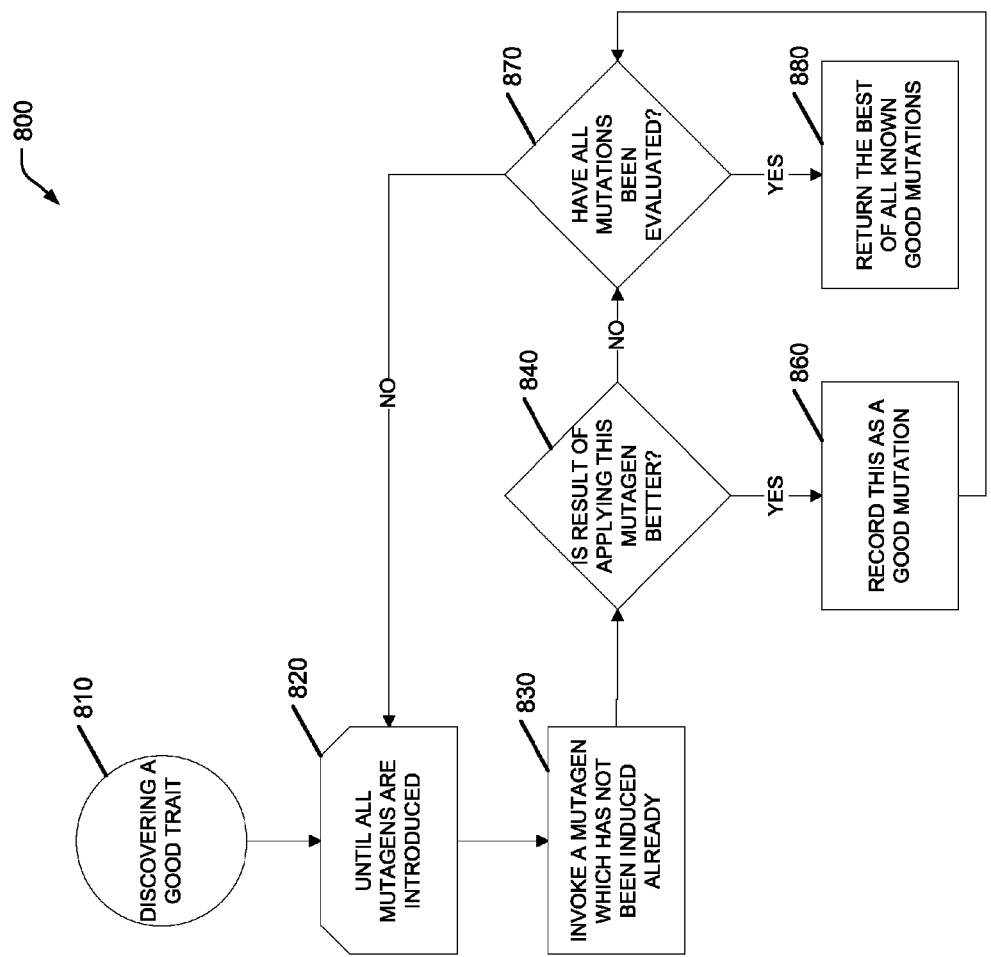
FIG. 8 illustrates a mutagen discovery process that forms part of the larger evolution process shown in FIG. 7, according to various embodiments of the invention.

FIG. 8 illustrates a mutagen discovery process 800 that forms part of the larger evolution process 700 shown in FIG. 7, according to various embodiments of the invention. In this case, an expansion of the activity that can occur within block 720 of FIG. 7 is shown.

In many embodiments, not all possible mutations are used to determine whether additional, potential matching elements within edges exist. Rather, a set of mutagens is applied that has been determined, perhaps via discovery, to provide a greater strength in matching than other mutagens. This process 800 is shown in FIG. 8.

The activities of blocks 810, 820, 830, 840, and 860 may be applied until the better-performing mutagens (taken from a set of available mutagens) have been identified. Thus, the process 800 may begin at block 810 and operate until a set of useful traits are discovered. One by one, mutagens are invoked at blocks 820 and 830. The result of the mutation is evaluated at block 840, to determine whether it is better (e.g., provides a higher degree of similarity) than previously-applied mutagens. If so, the result is recorded at block 860. If not, and additional mutagens are available for evaluation, as determined at block 870, these are applied as well. Eventually, all mutagens in the provided set may be tested, and those that operate to provide the desired degree of similarity between elements within edges are returned at block 880.

Figure 9:
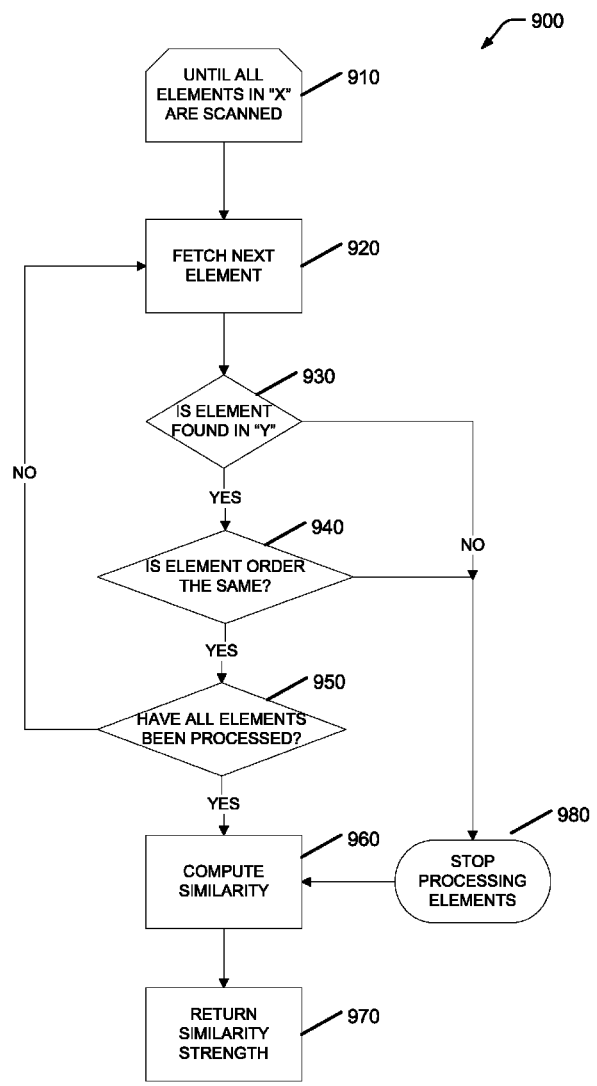
FIG. 9 illustrates the process of determining a degree of similarity, according to various embodiments of the invention.

FIG. 9 illustrates the process 900 of determining a degree of similarity, according to various embodiments of the invention. In this case, one or more mutagens are applied to transform a string X, in an attempt to increase its degree of similarity to string Y. Thus, the process 900 may begin at block 910 and operate until all character elements in string X are scanned.

The process 900 may include fetching each element at block 920, and determining whether the same element is found in string Y at block 930. If not, processing halts at block 980. If so, processing continues at block 940 to determine whether the matching elements are in the same order. If not, processing halts at block 980. If so, processing continues at block 950 to determine whether all elements of the string X have been processed. If not, additional elements are fetched at block 920. If so, processing continues at block 960, where the degree of similarity is computed.

In a simple similarity comparison, the number of common elements may be used to compute the strength of a matching mutation. Thus, once a mutation is performed, the strength of the match can be measured by determining the number of common elements between two records. In most cases, the greater the number of common (matching) elements, the greater the degree of similarity. The similarity strength can be returned as a result at block 970, perhaps as a percentage of matching elements for the shorter record.

Match-making mutation relationships may be persisted, during run time or longer. A table or other database which holds the relational results of mutation analysis may be persisted only during run time, if desired. Once a matching set of records is determined for a given fact (e.g., a smaller set of matching records proffered by a Business User), the store of mutation analysis results may be destroyed. Matching tuples that are eventually identified may also be stored during run time, or longer, perhaps in a tangible storage medium.

Mutagens may be stored and/or provided as a pre-selected set. The basis of mutagen operation is usually to produce a unique variation with respect to the element receiving its application, the variation being evaluated to determine the best variation used to evolve an input into an output. Thus, in some embodiments, the implementation of every mutagen produces a unique variation in the output. One set of pre-selected mutagens can include element transformations that result in Upper Case elements, Lower Case elements, Capitalized elements, Uncapitalized elements, Swapped Case elements, and Reversed (order) elements. Transformations may include insertions (e.g., hyphenation) and deletions (e.g., first words, first and second words, spaces, numerals, and non-alphabetic characters). Other variations that can be used for validation and verification of mutation samples can be used to create new mutagens, which can also be introduced into the match-making apparatus or system. Thus, many embodiments may be realized.

Figure 10:
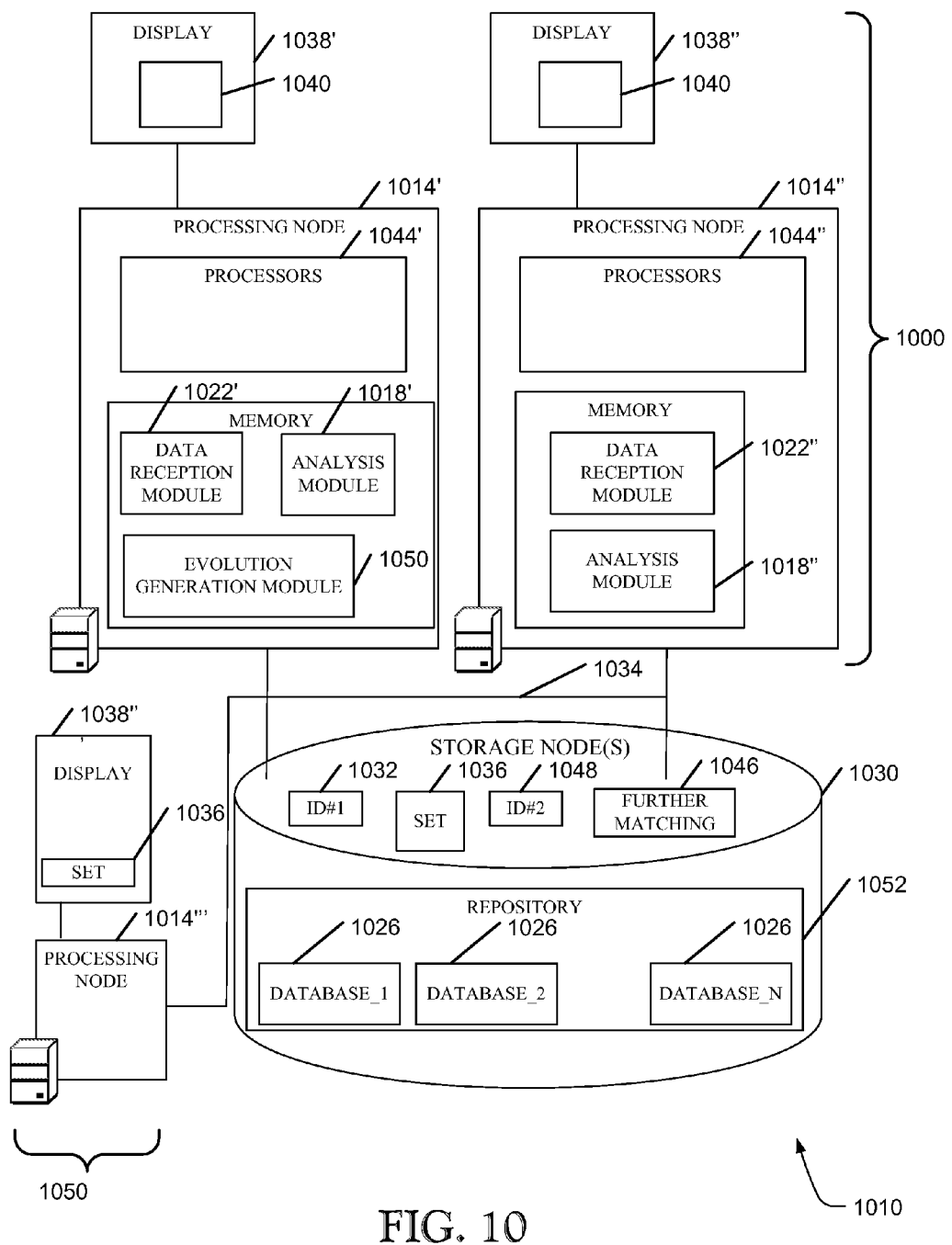
FIG. 10 is a block diagram of apparatus and systems, according to various embodiments of the invention.

For example, FIG. 10 is a block diagram of apparatus 1000 and systems 1010 according to various embodiments of the invention. Given the information discussed previously, it can be seen that in some embodiments, an apparatus 1000 to match data from disparate sources may comprise one or more processing nodes 1014 that include one or more processors 1044 and data reception modules 1022 to receive a first identification of at least two records 1032 that match each other, perhaps taken from disparate sources 1026 comprising database_1 and database_2, among others. The identification of the matching records 1032 may be received from a terminal 1038, perhaps operated by a Business User.

The apparatus 1000 may comprise one or more desktop computers, for example, including clients, servers, or even multiple processing nodes 1014. Thus, the processing nodes 1014 may comprise one of a server or a client, for example.

The apparatus 1000 may further comprise one or more analysis modules 1018 to communicatively couple to the reception module(s) 1022. The analysis module(s) 1018 may operate to search at least two sources of data (e.g., database_1, database_2) to locate a set 1036 of potential matching records based on element transformation (e.g., mutation, via the application of mutagens) to determine common characteristics of the records 1032. The analysis module(s) 1018 may further operate to publish the set 1036 and to search at least one repository (e.g., the storage node 1030) to locate further matching records 1046 based on a second identification 1048 and the common characteristics, wherein the data reception module(s) 1022 operate to receive the second identification 1048 comprising matching members of the set 1036.

A display may be used to present potentially matching records to a Business User, so that a selection of appropriate matches (e.g., the records 1032) may be made by the apparatus 1000. Thus, the apparatus 1000 may further comprise one or more displays 1038 to display a menu of the set 1036, as well as a request to select the matching members within the set 1036, which results in the second identification 1048.

The apparatus may include an evolution generation module to evolve portions of records. Thus, the apparatus 1000 may further comprise an evolution generation module 1050 to effect the element transformation by applying mutagens to some portion of the records 1032. Additional embodiments may be realized.

For example, a system 1010 may comprise multiple processing nodes 1014, including more than one of the apparatus 1000, and perhaps a storage node 1030. The various nodes may be coupled over one or more networks 1034. Thus, a system 1010 may comprise a first processing node 1014' comprising one or more processors 1044' and a data reception module 1022' to receive the first identification of at least two records 1032 that match. The system 1010 may further comprise a second processing node 1014" comprising an analysis module 1018" to communicate with the data reception module 1022'. The data reception module 1022' and the analysis module 1018" operate as described previously.

The storage node 1030 may form part of the system 1010, perhaps being used to house a repository 1052 of the records being searched. The records may thus form part of the disparate sources 1026 of data, existing within the repository 1052.

The system 1010 may include one or more displays 1038 to permit users to choose which mutagens will be applied. Thus, the system 1010 may further comprise a display 1038 to display a menu 1040 of mutagens to apply to the further matching records 1046.

The nodes of the system 1010 may comprise physical nodes, virtual machines, and combinations of these. The system 1010 may include multiple servers and clients. Thus, the first processing node 1014' may comprise a client node, and the second processing node 1014" may comprise a server node, and vice versa. Still further embodiments may be realized.

Figure 11:
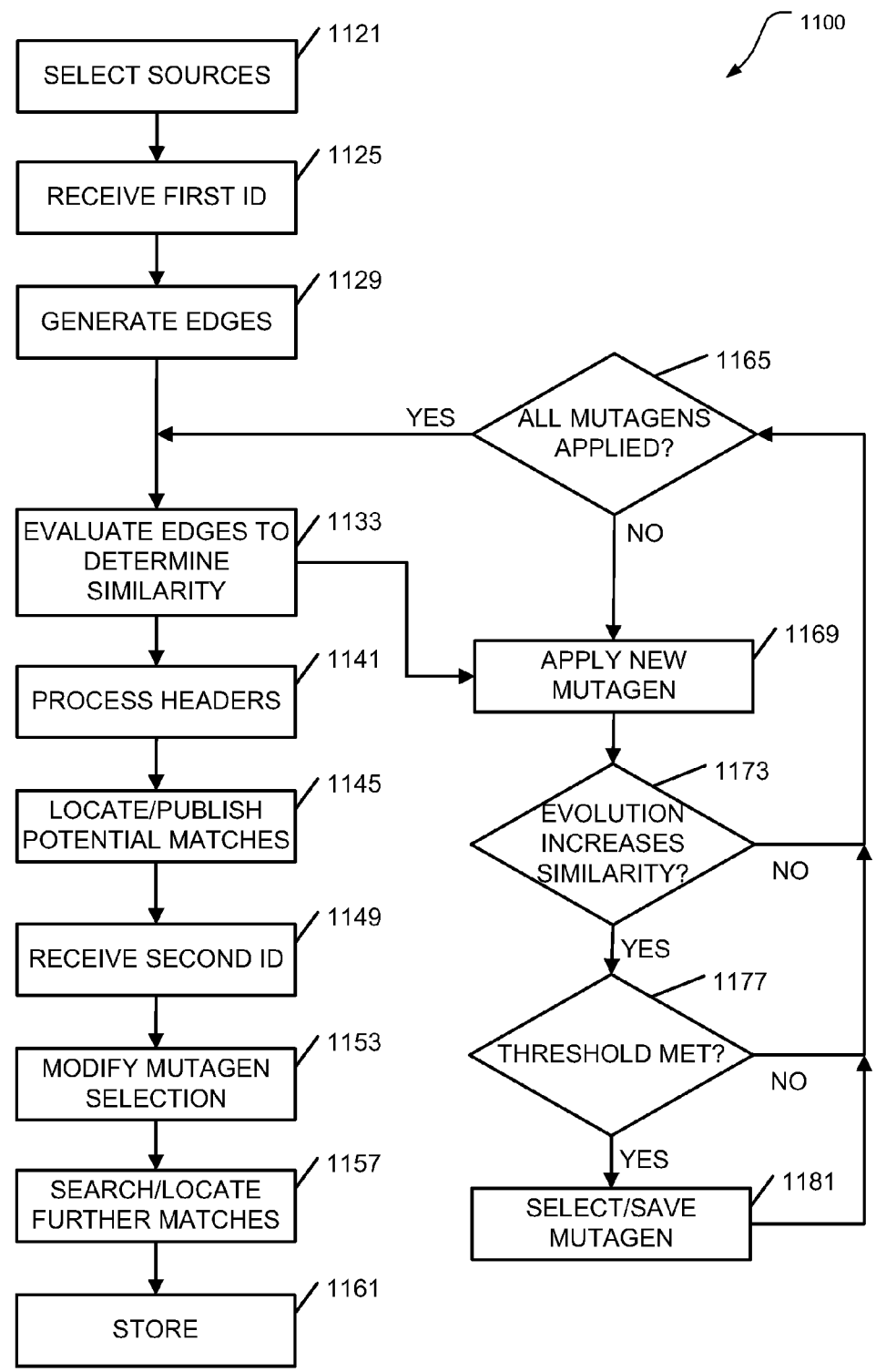
FIG. 11 is a flow diagram illustrating several computer-implemented methods according to various embodiments of the invention.

For example, FIG. 11 is a flow diagram illustrating several computer-implemented methods 1100 according to various embodiments of the invention. The methods 1100 are implemented in a machine-accessible and readable medium and are operational over processes within and among networks. The networks may be wired, wireless, or a combination of wired and wireless. The methods 1100 may be implemented as instructions, which when accessed by a specific machine, perform the processing depicted in FIG. 11. Given this context, matching data from disparate sources, such as two different data files, will now be discussed with reference to FIG. 11.

In some embodiments, the methods 1100 may comprise identifying first matching records, determining common characteristics within the first matching records, finding and publishing potential matching records (based on the common characteristics). Further activities may comprise identifying second matching records within the potential matching records, and finding additional records using the common characteristics and the identification of the second matching records.

Thus, in various embodiments, a processor-implemented method 1100 that can be used to match data from disparate sources may begin at block 1121 with selecting the sources. Such sources may include database files, spreadsheet files, or any other distinct collections of data. The method 1100 may continue on to block 1125 to include receiving a first identification of at least two records that match. This identification may be provided by a Business User, perhaps using a menu, and/or a machine.

Edges of intersection can be derived from a combination of record sets, perhaps using a graphical representation of the record sets, and/or by determining all possible element matches between two or more records. Thus, the method 1100 may continue on to block 1129 to include generating the edges as a set of all possible matches between elements of the at least two records.

Edges may be used to determine similarity between the sets. Thus, the method 1100 may comprise, at block 1133, evaluating edges arising from a combination of the at least two records to determine a degree of similarity. The method 1100 may continue from block 1133 directly to block 1141 in some embodiments, or if mutagens are to be applied, the method 1100 may continue from block 1133 to block 1169.

For example, simple character comparison can be used to determine the degree of similarity. Thus, the activity at block 1133 may comprise determining the degree of similarity using a character by character comparison of data elements to determine a matching percentage.

The similarity of elements that make up edges can be affected by evolution, which in turn can be tested by the application of mutagens to the elements, which may comprise portions of records in a data file, for example. Thus, the method 1100 may include, at block 1169, evolving some of the portions by applying one or more mutagens to at least one of the portions.

Mutagens may comprise pluggable tools that manipulate text or numeric values of records. Thus, the mutagens may comprise at least one of text or numerical transformation tools, among others. Those mutagens that operate to increase the degree of similarity between records may be selected for further application in future searches. Thus, the activity at block 1169 may comprise selecting one or more of the mutagens to apply to the any of the records (and portions thereof) encountered in the execution of the method 1100, based on increasing the degree of similarity between the records.

Mutation via text transformation, insertion, or deletion may be applied in an attempt to increase the degree of similarity, which may in turn be used to locate further matching records (see block 1157). Thus, the activity of block 1169 may comprise mutating portions of the at least two records to effect element transformation, the mutating comprising the application of mutagens including at least one of text transformation, insertion, or deletion to portions of the records.

Evolving portions of the records to change them can be used as a mechanism to determine whether the changes move one record closer to matching the other. Thus, at block 1173, it may be determined whether the degree of similarity between the records has increased (e.g., by comparing the result of one mutation with another). Therefore, the activity at block 1173 may comprise determining whether evolution of portions of at least one of the records increases the degree of similarity. If not, then the method 1100 may continue on to block 1165, with the application of a new/different mutagen, or a combination of mutagens. If so, then the method 1100 may continue on to block 1177.

The degree of similarity between records can be compared against a selected threshold value to determine whether a match exists, or not. Thus, the activity at block 1177 may comprise comparing the degree of similarity induced by element transformation to a threshold value, such as 0.80 or 0.90 (e.g., 80% or 90% similarity).

If the threshold is not met at block 1177, then the method 1100 may continue on to block 1165, with the application of a new/different mutagen, or a combination of mutagens. If the threshold is met, then the method 1100 may continue on to block 1181.

Mutagens may be initially selected based on the first set of matching records offered by a user, and then refined based on the second set of matching records offered by a user. Thus, the activity at block 1181 may comprise selecting a-set of mutagens to effect the element transformation. The selected mutagens may be saved in a repository, including any tangible storage medium.

Record headers may be used to boost confidence in the degree of similarity associated with matching edges. Thus, once some degree of similarity is determined, the method 1100 may continue on to block 1141 with processing headers to determine intersections between the headers and comparable ones of the edges to increase confidence in the degree of similarity, or the strength of matching.

The method 1100 may continue on to block 1145 with searching at least two sources of data (e.g., the sources selected at block 1121) to locate a set of potential matching records, based on element transformation to determine common characteristics of the at least two records. The activity at block 1145 may further include publishing the set, perhaps to a storage medium, a display, or hardcopy printout.

The method 1100 may continue on to block 1149 with receiving a second identification of matching members of the set. This identification can be provided by a Business User, perhaps using a menu, and/or a machine.

Mutagens may be initially selected based on the first set of matching records offered by the user, and then refined based on the second set of matching records offered by the user. Thus, the method 1100 may comprise, at block 1153, modifying the set of mutagens initially selected (e.g., at block 1181) based on receiving the second identification of the matching members of the set.

The method 1100 may go on to block 1157 to include searching at least one repository to locate further matching records based on the second identification and the common characteristics. The activity at block 1157 may further comprise locating the further matching records based on selecting at least one of the mutagens according to a degree of similarity provided by the application of the mutagens to the portions.

Records that are determined to match can be stored for later recall and processing. Thus, the method 1100 may comprise, at block 1161, storing the further matching records on a machine readable device, such as a flash memory or a disk drive, among others.

The methods 100, 400, 700, 800, 900, and 1100 described herein do not have to be executed in the order described, or in any particular order. Moreover, various activities described with respect to the methods identified herein can be executed in repetitive, serial, or parallel fashion. The individual activities of the methods shown in FIGS. 1, 4, 7, 8, 9, and 11 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured (e.g., via hardware) to perform the relevant operations. Whether temporarily or permanently configured, such processors may constitute processor-implemented modules, logic, or managers that operate to perform one or more operations or functions. The modules, logic, and managers referred to herein may, in some example embodiments, comprise processor-implemented modules, logic, or managers.

Similarly, the methods described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 12:
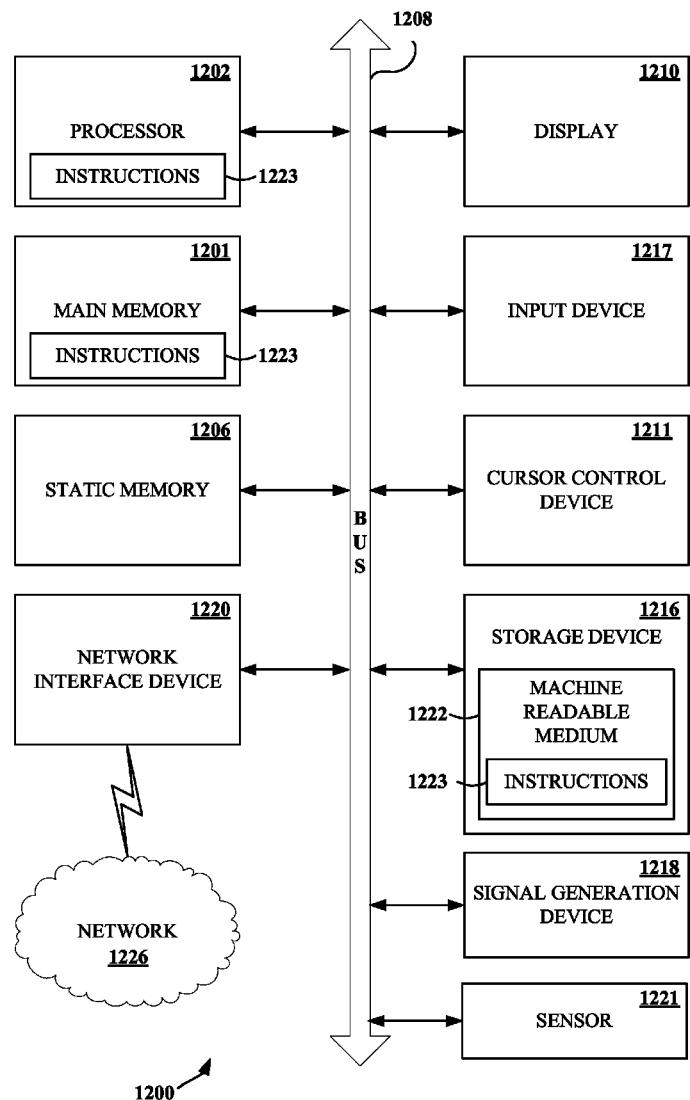
FIG. 12 is a block diagram of an article of manufacture, in the form of a specific machine, according to various embodiments of the invention.

For example, FIG. 12 is a block diagram of an article of manufacture, including a specific machine, according to various embodiments of the invention.

Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1202 coupled to a machine-readable medium 1222 such as a memory (e.g., removable storage media, as well as any memory including an electrical, optical, or electromagnetic conductor) having instructions 1223 stored thereon (e.g., computer program instructions), which when executed by the one or more processors 1202 result in the machine performing any of the actions described with respect to the methods above. In some embodiments, the article of manufacture comprises a tangible medium 1222, such as a CD-ROM or other non-volatile memory, to store the instructions 1223.

In some embodiments, a computer system 1200 may operate as a specific machine that includes a processor 1202 (e.g., a central processing unit (CPU), a graphics processing unit (GPU) or both), a main memory 1201 and a static memory 1206, which communicate with each other via a bus 1208. The computer system 1200 may further include a display unit 1210, an alphanumeric input device 1217 (e.g., a keyboard), and a user interface (UI) navigation device 1211 (e.g., a mouse). In one embodiment, the display, input device and cursor control device form part of a touch screen display. The computer system 1200 may additionally include a storage device (e.g., drive unit 1216), a signal generation device 1218 (e.g., a speaker), a network interface device 1220, and one or more sensors 1221, such as a global positioning system sensor, compass, accelerometer, or other sensor.

The computer system 1200 may comprise a specific machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The system 1200 may be similar to or identical to the apparatus 1000 or system 1010 of FIG. 10.

Returning to FIG. 12, it can be seen that the drive unit 1216 includes a machine-readable medium 1222 on which is stored one or more sets of instructions and data structures (e.g., instructions 1223) embodying or utilized by any one or more of the methodologies or functions described herein. The instructions 1223 may also reside, completely or at least partially, within the main memory 1201 and/or within the processor 1202 during execution thereof by the computer system 1200, the main memory 1201 and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 1223 may further be transmitted or received over a communications network 1226 using a transmission medium via the network interface device 1220 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Implementing the apparatus, systems, and methods described herein may operate to increase the efficiency of processing large data files provided by disparate sources.

Using plug-in tools, for example, Business Users can view two reports side by side, and apply data fusion techniques to unify them, perhaps by matching and merging columns. Increased processing performance and a simplified desktop experience may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a processing node comprising a processor and a data reception module to receive a first identification of at least two records that match; and
an analysis module to communicatively couple to the data reception module, the analysis module to
determine a mutagen that, when applied to at least one of the two records based on element transformation, enables identification of common characteristics of the at least two records, and
apply the determined mutagen to each one of multiple records in a first source of data to locate a set of potential matching records in the first source of data and a second source of data, based on element transformation and the common characteristics of the at least two records,
the analysis module to publish the set and to search at least one repository to locate further matching records based on a second identification and the common characteristics, wherein the data reception module is to receive the second identification comprising matching members of the set.

2. The apparatus of claim 1, further comprising:
display to display a menu of the set, and a request to select the matching members.

3. The apparatus of claim 1, further comprising:
an evolution generation module to effect the element transformation by applying mutagens to some portion of the at least two records.

4. The apparatus of claim 1, wherein the processing node comprises one of a server or a client.

5. A system, comprising:
a first processing node comprising a processor and a data reception module to receive a first identification of at least two records that match; and
a second processing node comprising an analysis module to communicate with the data reception module, the analysis module to
determine a mutagen that, when applied to at least one of the two records based on element transformation, enables identification of common characteristics of the at least to records, and
apply the determined mutagen to each one of multiple records in a first source of data to locate a set of potential matching records in the first source of data and a second source of data, based on element transformation and the common characteristics of the at least two records,
the analysis module to publish the set and to search at least one repository to locate further matching records based on a second identification and the common characteristics, wherein the data reception module is to receive the second identification comprising matching members of the set.

6. The system of claim 5, further comprising:
at least one storage node to house the repository.

7. The system of claim 5, further comprising:
a display to display a menu of mutagens to apply to the further matching records.

8. A method to execute on one or more processors that perform the method, comprising:
receiving a first identification of at least two records that match;
determining a mutagen that, when applied to at least one of the two records based on element transformation, enables identification of common characteristics of the at least two records;
applying the determined mutagen to each one of multiple records in a first source of data to locate a set of potential matching records in the first source of data and a second source of data, based on element transformation and the common characteristics of the at least two records;
publishing the set;
receiving a second identification of matching members of the set; and
searching at least one repository to locate further matching records based on the second identification and the common characteristics.

9. The method of claim 8, further comprising:
evaluating edges arising from a combination of the at least two records to determine a degree of similarity.

10. The method of claim 9, further comprising:
generating the edges as a set of all possible matches between elements of the at least two records.

11. The method of claim 9, further comprising:
processing headers to determine intersections between the headers and comparable ones of the edges to increase confidence.

12. The method of claim 9, wherein the evaluating further comprises:
determining the degree of similarity using a character by character comparison of data elements to determine a matching percentage.

13. The method of claim 9, wherein the element transformation comprises:
determining whether evolution of portions of at least one of the at least two records increases the degree of similarity.

14. The method of claim 13, wherein the evolution further comprises:
evolving some of the portions by applying one or more mutagens to at least one of the portions.

15. The method of claim 14, wherein the mutagens comprise at least one of text or numerical transformation tools.

16. The method of claim 14, further comprising:
selecting one of the mutagens to apply to the further matching records based on increasing the degree of similarity.

17. The method of claim 16, further comprising:
   storing the further matching records on a machine readable device.

18. The method of claim 9, wherein the evaluating further comprises:
   comparing the degree of similarity induced by the element transformation to a threshold value.

19. An article comprising a tangible, non-transitory computer-readable storage medium containing executable instructions stored thereon which, when executed, result in a processor performing:
   receiving a first identification of at least two records that match;
   determining a mutagen that, when applied to at least one of the two records based on element transformation, enables identification of common characteristics of the at least two records;
   applying the determined mutagen to each one of multiple records in a first source of data to locate a set of potential matching records in the first source of data and a second source of data, based on element transformation and the common characteristics of the at least two records;
   publishing the set;
   receiving a second identification of matching members of the set; and
   searching at least one repository to locate further matching records based on the second identification and the common characteristics.

20. The article of claim 19, containing executable instructions stored thereon which, when executed, result in the processor performing:
   mutating portions of the at least two records to effect the element transformation, the mutating comprising application of mutagens including at least one of text transformation, insertion, or deletion to the portions; and
   locating the further matching records based on selecting at least one of the mutagens according to a degree of similarity provided by the application of the mutagens to the portions.

21. The article of claim 19, containing executable instructions stored thereon which, when executed, result in the processor performing:
   selecting a set of mutagens to effect the element transformation; and
   modifying the set of mutagens based on receiving the second identification of the matching members of the set.

* * * * *